(12) United States Patent
Yamazaki et al.

(10) Patent No.: US 7,771,282 B2
(45) Date of Patent: Aug. 10, 2010

(54) FIXED TYPE CONSTANT VELOCITY UNIVERSAL JOINT

(75) Inventors: Kenta Yamazaki, Iwata (JP); Minoru Ishijima, Iwata (JP)

(73) Assignee: NTN Corporation, Osaka (JP)

( * ) Notice: Subject to any disclaimer, the term of this patent is extended or adjusted under 35 U.S.C. 154(b) by 676 days.

(21) Appl. No.: 10/585,941

(22) PCT Filed: Dec. 8, 2004

(86) PCT No.: PCT/JP2004/018675
§ 371 (c)(1),
(2), (4) Date: May 3, 2007

(87) PCT Pub. No.: WO2005/073579
PCT Pub. Date: Aug. 11, 2005

(65) Prior Publication Data
US 2007/0280778 A1  Dec. 6, 2007

(30) Foreign Application Priority Data
Jan. 30, 2004  (JP) ............... 2004-023977

(51) Int. Cl.
*F16D 3/224* (2006.01)
(52) U.S. Cl. ............................. 464/89; 464/906
(58) Field of Classification Search .......... 464/89, 464/145, 906
See application file for complete search history.

(56) References Cited

U.S. PATENT DOCUMENTS

| 2,875,599 | A | * | 3/1959 | Gregory | ............ 464/145 |
| 3,424,473 | A | * | 1/1969 | Morgan | ............ 464/145 X |
| 3,817,057 | A | | 6/1974 | Orain | |
| 4,405,032 | A | | 9/1983 | Welschof et al. | |
| 5,374,219 | A | | 12/1994 | Kohara et al. | |
| 2002/0115492 | A1 | * | 8/2002 | Jacob | ............ 464/145 |

(Continued)

FOREIGN PATENT DOCUMENTS

EP  0 284 647  10/1988

(Continued)

OTHER PUBLICATIONS

European Search Report dated May 29, 2009 for European Application No. 04807034.6.

*Primary Examiner*—Greg Binda
(74) *Attorney, Agent, or Firm*—Wenderoth, Lind & Ponack, L.L.P.

(57) ABSTRACT

The present invention provides a fixed type constant velocity universal joint suitable for applications where vibration is harmful. A fixed-type constant velocity universal joint (1) includes an inner member (20) fitted in an outer member (10) with a retainer (40) therebetween, and balls (30) provided between track grooves (14, 24) of the outer member (10) and the inner member (20) as well as retained by the retainer (40). The outer member (10) is constructed as a multilayer structure of three or more layers formed of an outside member (15), one or a plurality of intermediate members (16), and an inside member (17), and at least one of the intermediate members (16) is constructed of an elastic material. Cushioning action of the intermediate members (16) can reliably absorb vibration transmitted from either of the outer member (10) and the inner members (20) with the members (10, 20) set to a predetermined operation angle.

11 Claims, 7 Drawing Sheets

U.S. PATENT DOCUMENTS

2003/0083135 A1    5/2003    Yamazaki et al.

FOREIGN PATENT DOCUMENTS

| GB | 2 075 635 | 11/1981 |
| JP | 48-93839 | 12/1973 |
| JP | 57-4405 | 1/1982 |
| JP | 60-35920 | 3/1985 |
| JP | 1-115021 | 5/1989 |
| JP | 3-28325 | 3/1991 |
| JP | 5-45252 | 6/1993 |
| JP | 6-87141 | 12/1994 |
| JP | 2003-130082 | 5/2003 |

\* cited by examiner

FIXED TYPE CONSTANT VELOCITY UNIVERSAL JOINT

FIELD OF THE INVENTION

The present invention relates to a fixed type constant velocity universal joint and, more particularly, to a fixed type constant velocity universal joint suitable for applications where vibration is harmful as in a case of an automotive steering device.

BACKGROUND OF THE INVENTION

Constant velocity universal joints are roughly classified into fixed type joints which solely allow angular displacement between input and output shafts and slide type joints in which angular displacement and axial displacement are permissible, and the kind of the joint to be used is selected according to its application, condition of use, etc. As the fixed type constant velocity universal joints, Rzeppa type joints and undercut free type joints are widely known.

FIG. 7 shows, by way of example, a Rzeppa type joint 1' (hereinafter referred to as joint 1'), which is a kind of the fixed type constant velocity universal joint. The joint 1' is mainly composed of: an outer member 10 having at one end of a first shaft portion 11a cup portion 13 with a spherical inner surface 12, with a plurality of track grooves 14 being formed in the spherical inner surface 12 of the cup portion 13; an inner member 20 having at one end of a second shaft portion 21 an inner ring 23 with a spherical outer surface 22, with a plurality of track grooves 24 being formed in the spherical outer surface 22 of the inner ring 23; a plurality of balls 30 arranged between the track grooves 14 and 24; and a retainer 40 having a spherical outer surface 42 corresponding to the spherical inner surface 12 of the outer member 10 and a spherical inner surface 44 corresponding to the spherical outer surface 22 of the inner member 20 and equipped with a plurality of ball pockets 46 for retaining the balls 30 arranged at predetermined circumferential intervals (see, for example, JP 2003-130082 A).

In the above-described joint 1', sphere centers O of the spherical inner surface 12 of the cup portion 13 of the outer member 10 and of the spherical outer surface 22 of the inner ring 23 of the inner member 20 substantially coincide with each other. A center $O_1$ of the track grooves 14 of the outer member 10 and a center $O_2$ of the track grooves 24 of the inner member 20 are axially offset in opposite directions by substantially the same distance with respect to the sphere centers O. As a result, the ball track formed by the track grooves 14 and 24 assume a wedge-like shape diverging from a depth side toward an opening side of the outer member 10. In the Rzeppa joint 1', longitudinal sectional configurations of the track grooves 14 and 24 are curved over their entire regions, with the centers of the curved portions being the centers $O_1$ and $O_2$ of the track grooves 14 and 24, respectively. In contrast, in the undercut free type joint, the opening side end portion of each track groove is formed in a configuration extending straight in the axial direction.

As shown in FIG. 8, in the above-described joint 1', when rotational torque is applied to one of the outer member 10 and the inner member 20, with the outer member 10 and the inner member 20 being at an operation angle of θ, the balls 30 are caused to reciprocate in the ball track, with the track grooves 24 of the inner ring 23 rocking relative to the track grooves 14 of the outer member 10, whereby the rotational torque is transmitted to the other member.

FIG. 9A shows an example of the above-mentioned joint 1' as applied to a steering device 71 of an automobile. In the steering device 71, one or a plurality of intermediate shafts 75 are arranged between an input shaft 73 connected to a steering wheel 72 and a steering gear 74, and these members are connected by the joints 1'. In the steering device 71, when vibration is transmitted to the steering wheel 72 from the wheels (not shown) during traveling, there is a fear of the driver experiencing discomfort and an operational error being induced. Thus, it is necessary for the steering device 71 to be capable of preventing transmission of vibration to the steering wheel 72. Conventionally, as a means for absorbing such the vibration, there is provided between the input shaft 73 and the intermediate shafts 75 an elastic shaft coupling 76 as shown in FIGS. 9B and 9C (see, for example, JP 1996-133097 A and JP 2002-310182 A). In the elastic shaft coupling 76 of FIGS. 9B and 9C, an inner shaft 76a and an outer shaft 76b are fit-engaged with each other through the intermediation of a cushioning member 76c.

It should be noted, however, that if not only the elastic shaft coupling 76 but also the joints 1' can absorb vibration, it is more effective in cutting off transmission of vibration to the steering wheel 72. As shown in FIGS. 7 and 8, in the above-described joint 1', there is provided a pressing portion 21a for axially applying an elastic pressing force to an end portion of the second shaft portion 21 constituting the inner member 20, and the retainer 40 is provided with a receiving portion 48 for receiving the pressing force from the pressing portion 21a. However, in a state where the outer member 10 and the inner member 20 are at an operation angle of θ, as shown in FIG. 8, the direction of the vibration transmitted axially from the outer member 10 and the direction in which the elastic action of the pressing member 21a is exerted differ from each other, so it is impossible to effectively absorb the vibration transmitted from the outer member 10 to the inner member 20.

SUMMARY OF THE INVENTION

The present invention has been made in view of the above problem in the prior art. It is an object of the present invention to provide a fixed type constant velocity universal joint suitable for applications where vibration is harmful as in a case of an automotive steering device.

To achieve the above-mentioned object, according to the present invention, a fixed type constant velocity universal joint includes: an outer member having a spherical inner surface with a plurality of track grooves formed therein; an inner member having a spherical outer surface with a plurality of track grooves formed therein; a ball arranged in a wedge-shaped ball track formed by the track grooves of the outer member and the track grooves of the inner member; and a retainer arranged between the spherical inner surface of the outer member and spherical outer surface of the inner member and adapted to retain the ball, in which the outer member is formed in a multi-layer structure of three or more layers formed of an outside member, one or a plurality of intermediate members, and an inside member, and in which at least one of the intermediate members is formed of an elastic material.

More specifically, as shown, for example, in FIG. 1, the outer member 10 is formed in a three-layer structure composed of an outside member 15, an intermediate member 16, and an inside member 17, with the intermediate member 16 being formed of an elastic material. Instead of providing only one intermediate member 16, it is also possible to provide a plurality of the intermediate members 16, with at least one of the plurality of intermediate members 16 being formed of an elastic material. By thus forming the outer member 10 in a multi-layer structure, due to the cushioning action of the intermediate member 16, it is possible to reliably absorb vibration transmitted from whichever of the outer member 10 and the inner member 20. Thus, it is possible to provide the fixed type constant velocity universal joint suitable for applications where vibration is harmful.

When forming the outer member in a multi-layer structure as described above, it is possible to effect torque transmission between the outer member and the inner member by providing an engagement portion on both the inner side of the outside member and the outer side of the inside member.

In the outer member, the inside member is fit-engaged with the outside member through the intermediation of the intermediate member, and the outside member, the intermediate member, and the inside member are integrally fixed together by a fixing device.

When fit-engaging the inside member with the outside member through the intermediation of the intermediate member, there is provided a fixing device for integrally fixing together the outside member, the intermediate member, and the inside member to prevent detachment of the intermediate member and the inside member from the outside member. Examples of the fixing device include one which is formed as a member separate from the outside member, or the like, and which is integrally mounted to the outside member to be locked to an end portion of the inside member, and one which is locked to an end portion of the inside member through plastic deformation of a predetermined portion of the outside member.

While it is desirable to use a rubber material for the elastic material forming the intermediate member from the viewpoint of workability and availability, any other material will do as long as it provides a desired cushioning action.

Further, when used, in particular, as a constant velocity universal joint for a steering device arranged between the steering wheel and the steering gear of a vehicle, the above-described fixed type constant velocity universal joint effectively provides a vibration absorbing effect as mentioned above, making it possible to prevent vibration of the steering wheel. The steering device may be an electric power steering device (EPS) imparting an assistant force by a motor, or a hydraulic power steering device imparting an assist force through oil pressure.

In the present invention, the outer member is provided with an elastic member as described above, whereby it is possible to absorb vibration with a simple structure. Thus, it is possible to provide the fixed type constant velocity universal joint suitable for applications where vibration is harmful as in the case of a steering device.

BRIEF DESCRIPTION OF THE DRAWINGS

FIGS. 6A through 6D are diagrams showing modifications of a fixing device, in which FIG. 6A is an end view of an opening of the outer member, FIG. 6B being an enlarged longitudinal sectional view of a main portion of the outer member, FIG. 6C is an end view of the opening of the outer member, and FIG. 6D is a longitudinal sectional view of a main portion of the outer member;

DESCRIPTION OF THE PREFERRED EMBODIMENTS

Figure 7:
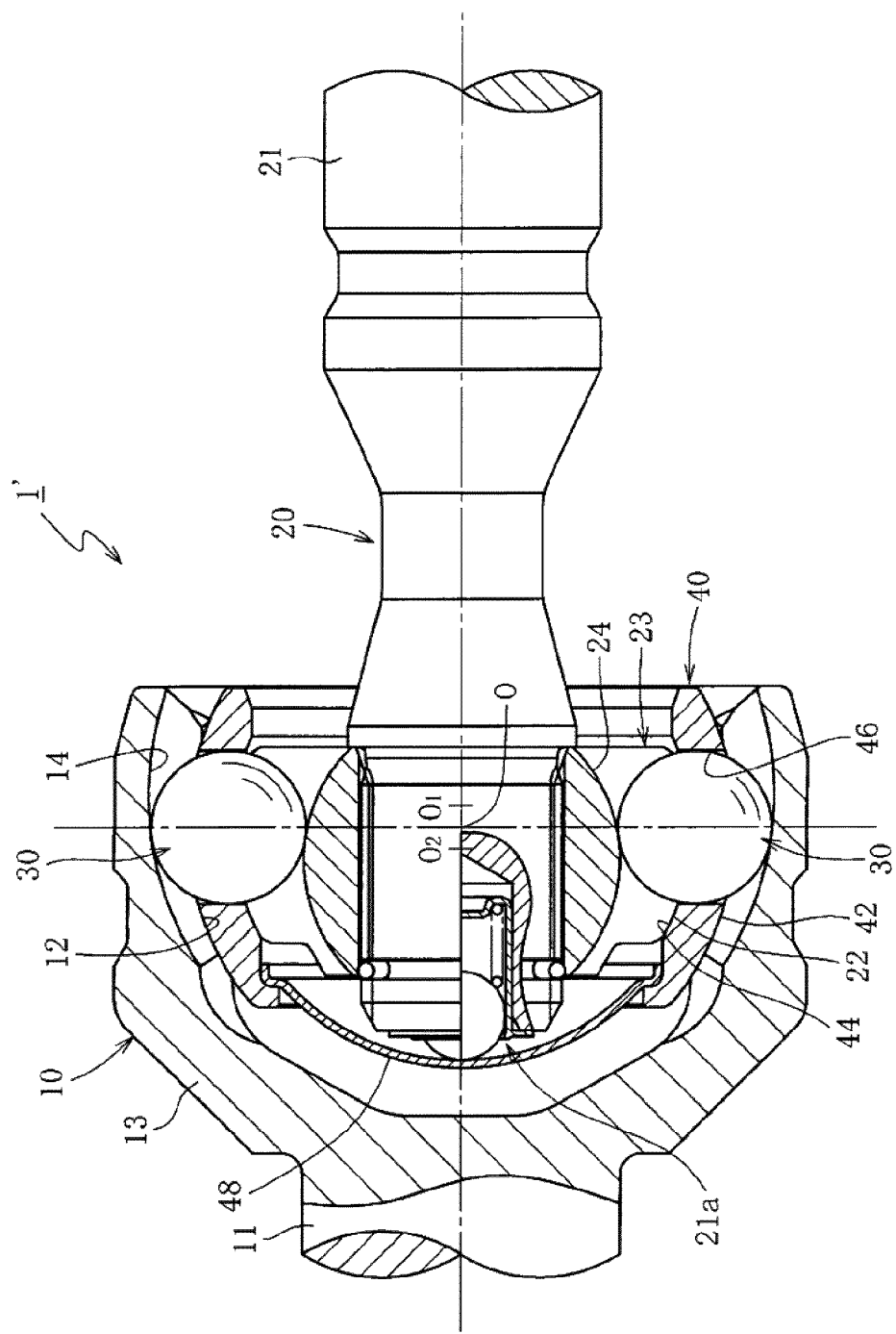
FIG. 7 is a longitudinal sectional view of a conventional fixed type constant velocity universal joint.
Figure 8:
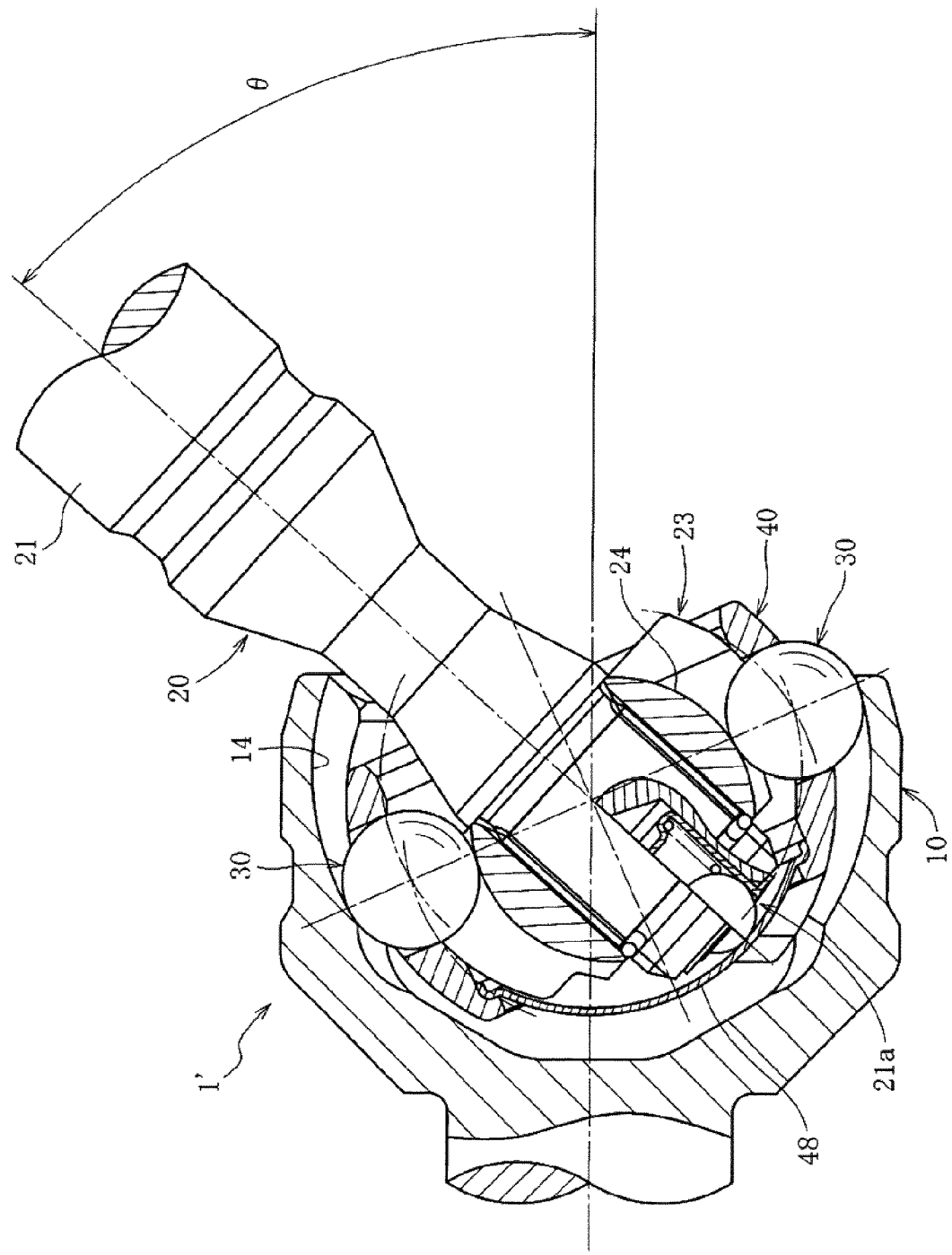
FIG. 8 is an explanatory view illustrating an operation of a conventional fixed type constant velocity universal joint.
Figure 9A:
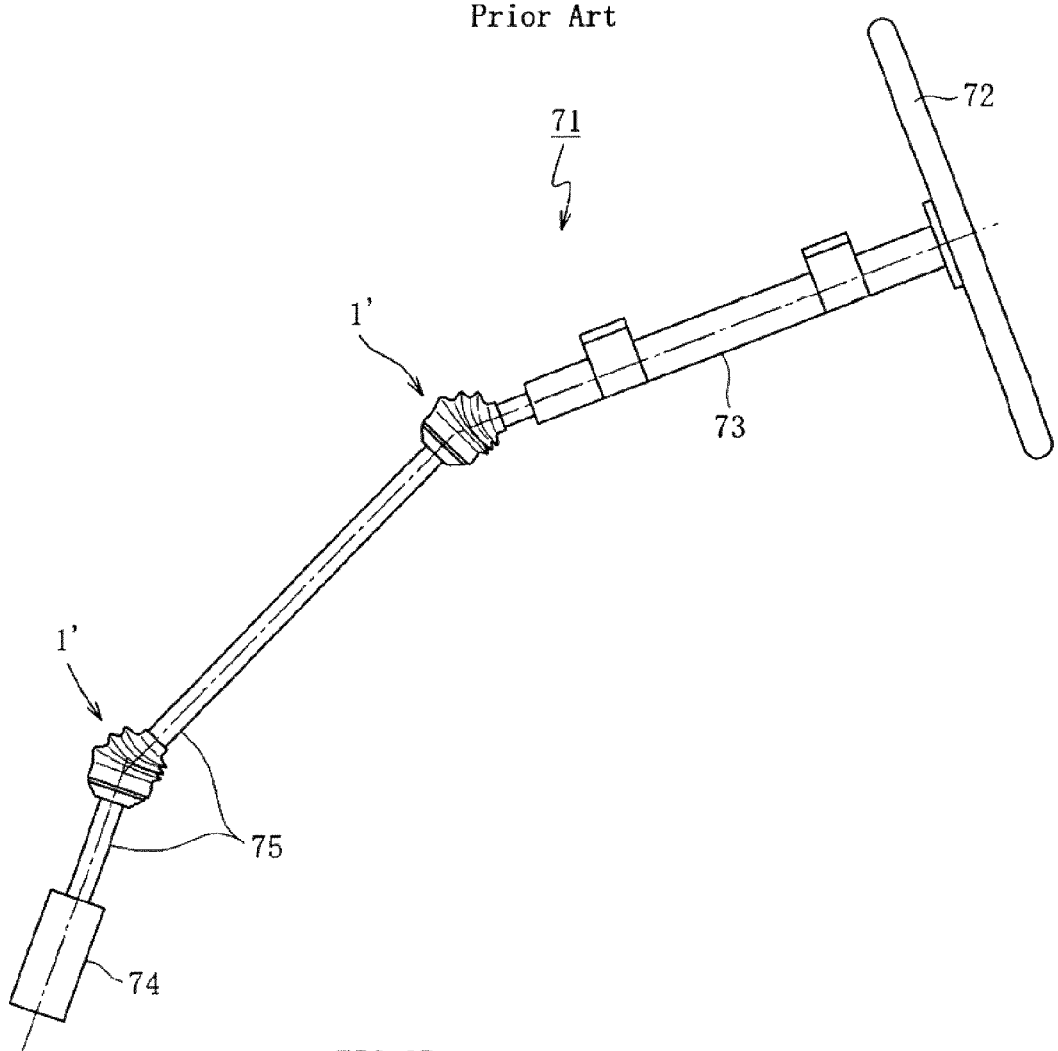
FIGS. 9A through 9C are schematic views of the conventional fixed type constant velocity universal joint as applied to a steering device.
Figure 9B:
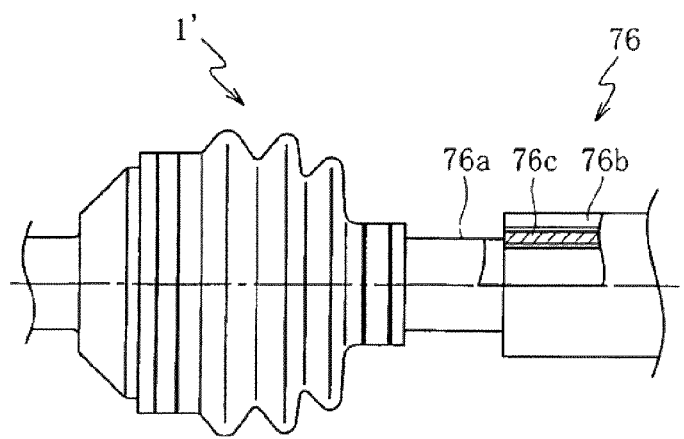
Figure 9C:
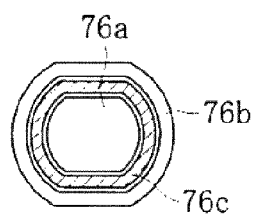

In the following, a fixed type constant velocity universal joint according to a preferred embodiment of the present invention will be described with reference to FIGS. 1 through 6D. The components that are the same as those of a conventional joint 1' shown in FIGS. 7 and 8 are indicated by the same reference symbols, and a detailed description thereof will be omitted.

Figure 1:
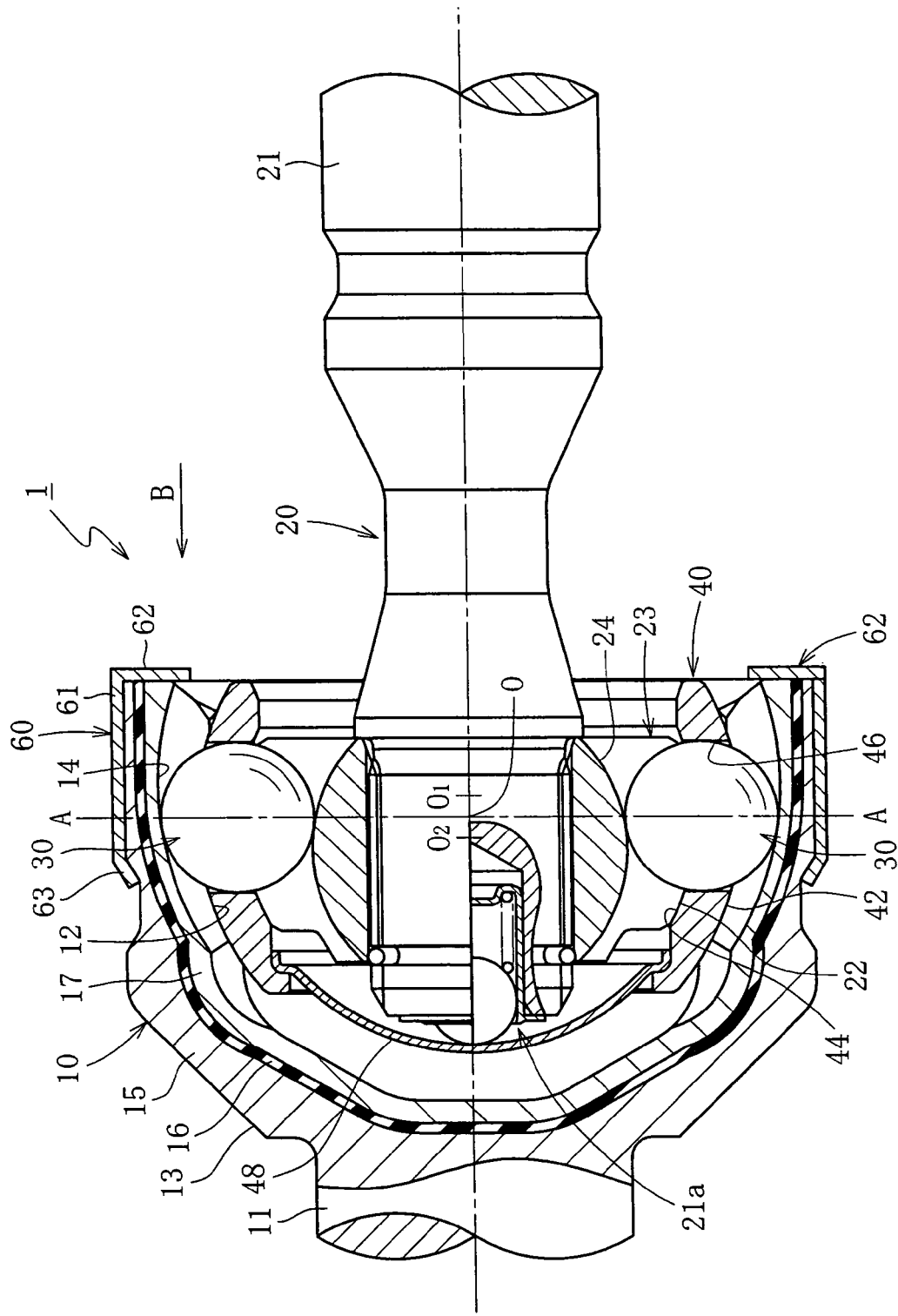
FIG. 1 is a longitudinal sectional view showing the present invention as applied to a Rzeppa type joint, which is a kind of fixed type constant velocity universal joint.

FIG. 1 shows the present invention as applied to a Rzeppa type joint 1 (hereinafter referred to as joint 1), which is a kind of the fixed type constant velocity universal joint. As shown in FIG. 1, the joint 1 is mainly composed of an outer member 10, an inner member 20, balls 30, and a retainer 40; the outer member 10 has a cup portion 13 formed in a three-layer structure composed of an outside member 15, an intermediate member 16, and an inside member 17, with the intermediate member 16 being formed of an elastic material.

Figure 2:
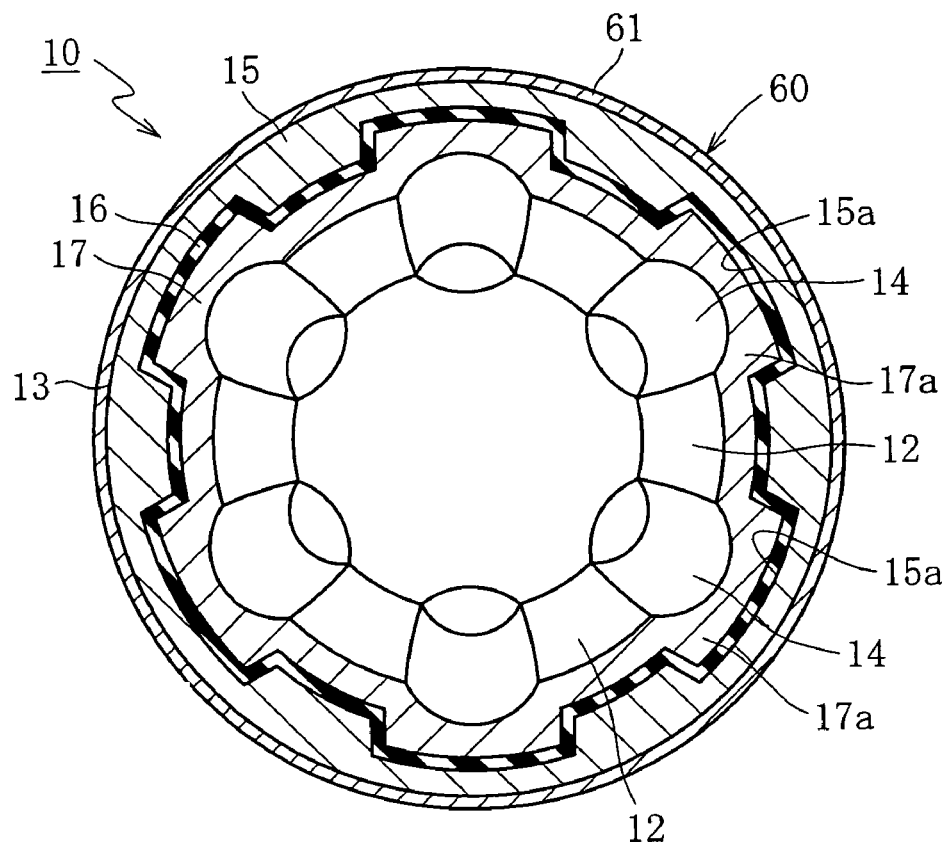
FIG. 2 is a cross-sectional view of an outer member taken along the line A-A of FIG. 1.

As shown in FIGS. 1 and 2, the outside member 15 is a member constituting a main body of the outer member 10, and is formed by providing an outer layer portion of the cup portion 13 at an end of a first shaft portion 11. As shown in FIG. 2, an inner surface of the outside member 15 is formed in a spherical configuration corresponding to a spherical inner surface 12 of the cup portion 13, and engagement grooves 15a as engagement portions for engagement with the inside member 17 are provided at positions corresponding to a plurality of track grooves 14.

As shown in FIGS. 1 and 2, the intermediate member 16 is a member provided between the outside member 15 and the inside member 17 and formed of an elastic material, such as rubber or a resin. The intermediate member 16 is formed in a cup-like configuration corresponding to a configuration of a gap between the outside member 15 and the inside member 17, and is arranged so as to be in intimate contact with the entire inner surface of the outside member 15 and the entire outer surface of the inside member 17.

As shown in FIGS. 1 and 2, the inside member 17 is a member constituting the spherical inner surface 12 of the cup portion 13 of the outer member 10. The outer surface of the inside member 17 is formed in a spherical configuration corresponding to the spherical inner surface 12, and its outer diameter is somewhat smaller than the inner diameter of the outside member 15. As shown in FIG. 2, on an outer surface of the inside member 17, there are formed, at positions corresponding to the plurality of track grooves 14 formed on the inner surface side, ridges 17a as engagement portions for engagement with the engagement grooves 15a of the outside member 15. The ridges 17a have a width somewhat smaller than a width of the engagement grooves 15a of the outside member 15, and are formed so as to protrude into the engagement grooves 15a of the outside member 15 to be engaged with the engagement grooves 15a of the outside member 15 through the intermediation of the intermediate member 16. With this construction, torque transmission is possible between the outside member 15 and the inside member 17.

Figure 3:
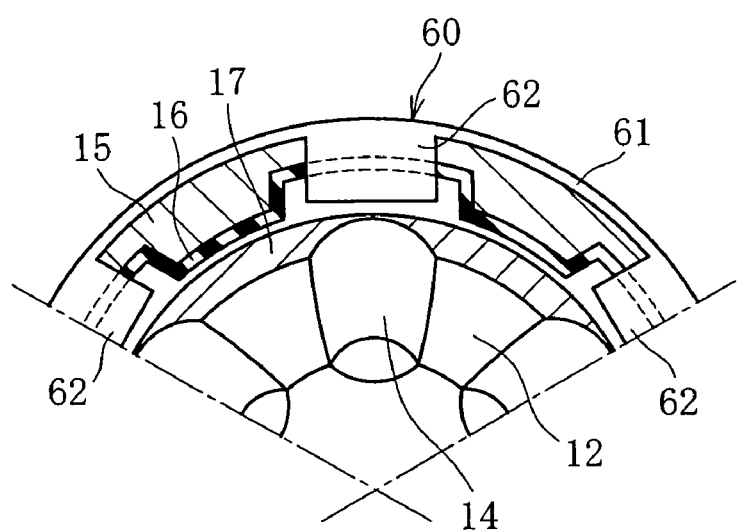
FIG. 3 is an end view of an opening of the outer member as seen in a direction of the arrow B of FIG. 1.

In FIGS. 1 through 3, reference numeral 60 indicates a fixing member as a fixing device, and the fixing member 60 serves to prevent the intermediate member 16 and the inside member 17 from being detached from the outside member 15. As shown in FIGS. 1 and 3, the fixing member 60 has a cylinder portion 61 to be fit-engaged with the outer side of the opening end portion of the outside member 15, and a plurality of lock portions 62 extending radially inwards in a tongue-like configuration from positions at the end of the cylinder portion 61 corresponding to the track grooves 14 of the outer member 10. As shown in FIG. 1, the depth-side end portion (end portion on the opposite side of the lock portions 62) is inwardly caulked to form a caulked portion 63, which is engaged with the outer portion of the outside member 15. As shown in FIG. 3, the lock portions 62 are locked to the respective opening side end portions of the outside member 15, the intermediate member 16, and the inside member 17 at positions corresponding to engagement positions of the outside member 15 and the inside member 17. As a result, the outside member 15, the intermediate member 16, and the inside member 17 are integrally fixed together to form the outer member 10.

As described above, in the joint 1 of the present invention, the outer member 10 is formed in a three-layer structure by providing the intermediate member 16, which is formed in a cup-like configuration of an elastic material, such as rubber or resin, between the outside member 15 and the inside member 17, so vibration transmitted from whichever of the outer member 10 and the inner member 20, with the outer member 10 and the inner member 20 being at a predetermined operation angle of θ (see FIG. 8), can be absorbed by the cup portion 13 of the outer member 10.

Figure 4:
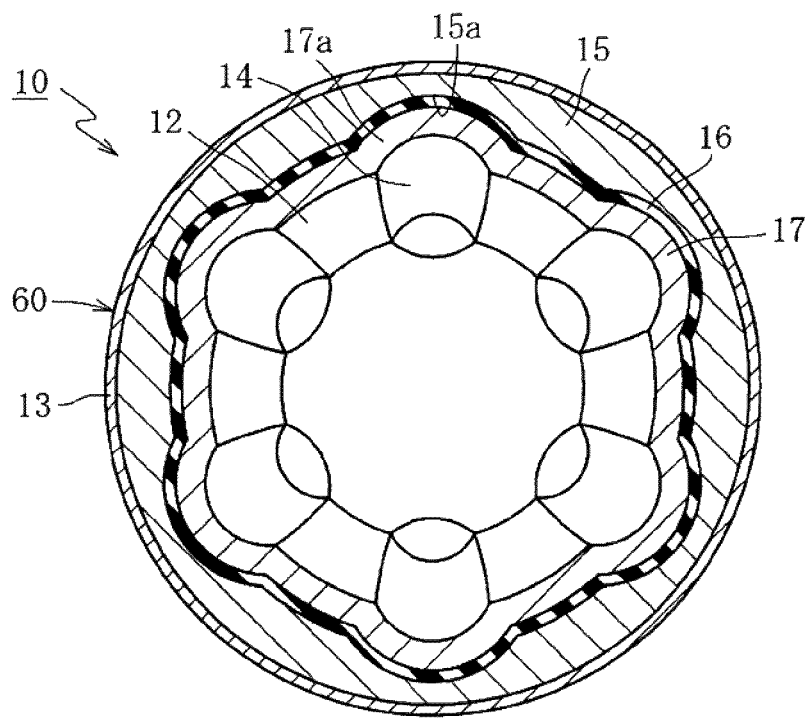
FIG. 4 is a cross-sectional view, taken along the line A-A of FIG. 1, of an outer member according to a modification of the present invention.

As described above, the description has been made of one embodiment of the present invention, however the present invention is not restricted to the above-described embodiment but allows various modifications. For example, as shown in FIG. 4, the engagement grooves 15a of the outside member 15 and the ridges 17a of the inside member 17 may be of any other configuration, such as an arcuate cross-sectional configuration, in correspondence with the track grooves 14 of the cup portion 13 as long as it allows torque transmission between the outside member 15 and the inside member 17.

Figure 5:
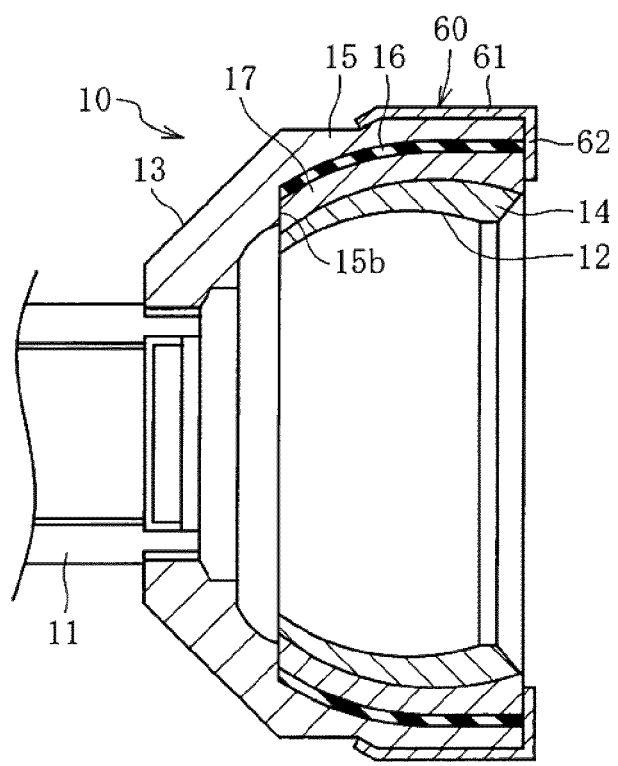
FIG. 5 is a longitudinal sectional view of the outer member according to a modification of the present invention.

The configuration of the intermediate member 16 is not restricted to a cup-like one. For example, as shown in FIG. 5, the intermediate member 16 may be formed in a cylindrical configuration. The cylindrical intermediate member 16 is suitable for a case in which as shown, for example, in FIG. 5, the outer member 10 is composed of the two members of the first shaft portion 11 and the cup portion 13 (outer ring). The first shaft portion 11 and the cup portion 13 (outer ring) of FIG. 5 are connected together by an appropriate method, such as screw connection, plastic connection, welding, adhesion, press-fitting, or shrink fitting. In the case of FIG. 5, the inside member 17 may also be formed in a cylindrical configuration, locking the depth-side end portion of the inside member 17 by a step portion 15b provided on the inner surface of the outside member 15.

Figure 6A:
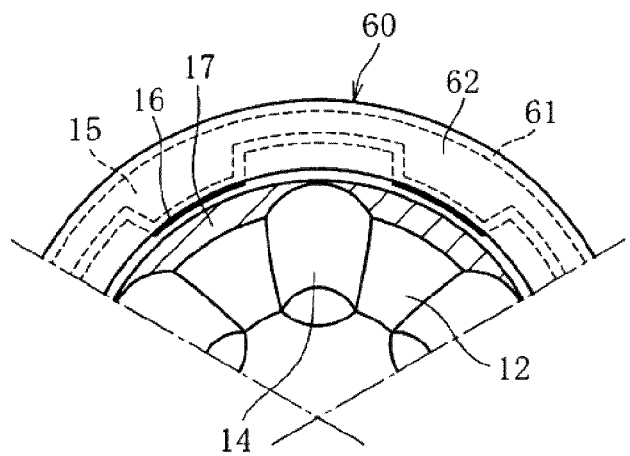

As shown in FIG. 6A, the lock portions 62 of the fixing member 60 may be formed over an entire periphery of the cylindrical portion 61. In this case, if the fixing member 60 slides circumferentially relative to the outer member 10, it is always possible to prevent detachment of the intermediate member 16 and the inside member 17.

Figure 6B:
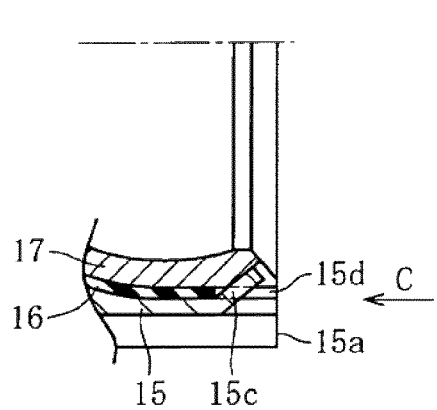
Figure 6C:
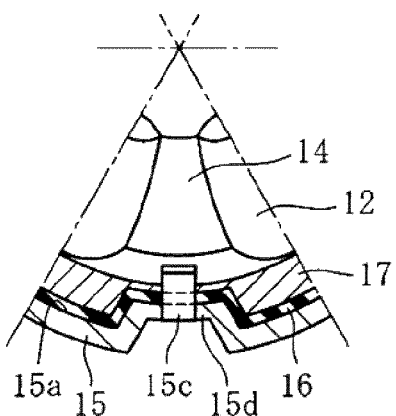

Further, as shown in FIGS. 6B and 6C, the fixing device may be formed by a lock portion 15c formed of an axial notch formed at the opening end of the outside member 15. As shown in FIG. 6C, the lock portion 15c is formed through formation of the outer configuration of the outside member 15 in correspondence with the inner configuration thereof. The lock portion 15c is formed in a small diameter portion 15d between the engagement grooves 15a, and is locked with the end portions of the intermediate member 16 and the inside member 17 through plastic deformation toward the inner side of the outside member 15. Apart from the notch formed at the end of the outside member 15, the lock portion 15c may also be a tongue-like protrusion formed at the end of the outside member 15 like the lock portions 62 of the fixing member 60 shown in FIGS. 1 and 3.

Figure 6D:
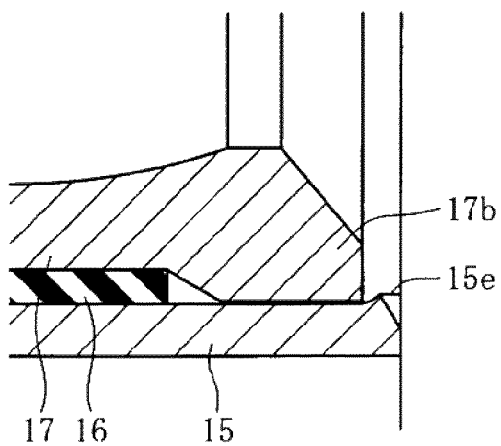

Further, as shown in FIG. 6D, it is also possible for the fixing device to be formed by a caulked portion 15e formed through plastic deformation toward the inner side of a part or all of the opening end portion of the outside member 15. In this case, there is formed a swollen portion 17b, which makes the outer diameter of the opening end portion of the inside member 17 substantially equal to the inner diameter of the opening end portion of the outside member 15, with the caulked portion 15e of the outside member 15 being locked to the swollen portion 17b of the inside member 17. The intermediate member 16 is arranged in the gap between the depth-side portions of the outside member 15 and the inside member 17, with the outer diameter of the depth-side portion of the inside member 17 being smaller than the inner diameter of the depth-side portion of the outside diameter 15.

Furthermore, it is also possible for the outside member 15, the intermediate member 16, and the inside member 17 to be integrated through baking and sticking the intermediate member 16 to the outside member 15 and the inside member 17. When the outside member 15, the intermediate member 16, and the inside member 17 are thus integrated through plastic deformation of the outside member 15 or baking and sticking the intermediate member 16, the number of components of the outer member 10 is reduced to thereby facilitate the assembly and suppress the production cost as compared with the case in which the fixing member 60 and the outside member 15 are formed as separate members.

It suffices for the outer member 10 to be of a multi-layer structure of three layers or more; when a plurality of intermediate members 16 are provided, it is possible to form the intermediate members 16 of different kinds of elastic material instead of forming them of the same kind of elastic material. Alternatively, it is also possible to form at least one intermediate member 16 of an elastic material, while forming the other intermediate members 16 of a non-elastic material.

While the above-described embodiment of the present invention is applied to a Rzeppa type joint 1, in which the pressing portion 21a is formed at an end of the second shaft portion 21 of the inner member 20 and in which the retainer 40 is provided with a receiving portion 48, the present invention is also applicable to any other fixed type constant velocity universal joint including an undercut free type joint.

What is claimed is:

1. A fixed type constant velocity universal joint comprising:
   an outer member having a multi-layer structure of three or more layers including an outside member, one or more intermediate members, and an inside member, and a spherical inner surface with a plurality of track grooves formed therein;
   an inner member having a spherical outer surface with a plurality of track grooves formed therein;

a plurality of balls each arranged in a wedge-shaped ball track formed by the track groove of the outer member and the track groove of the inner member;

a retainer arranged between the spherical inner surface of the outer member and spherical outer surface of the inner member and adapted to retain the plurality of balls; and a fixing means for fit-engaging the inside member with the outside member at an end of the outside member, thereby integrally fixing together the outside member, the one or more intermediate members, and the inside member, wherein at least one of the one or more intermediate members is formed of an elastic material, and wherein the elastic material comprises a rubber material.

2. A fixed type constant velocity universal joint according to claim 1, wherein the outside member and the inside member are provided with engagement portions for effecting torque transmission.

3. A fixed type constant velocity universal joint according to claim 2, wherein the fixed type constant velocity universal joint is used in a steering device arranged between a steering wheel and a steering gear of a vehicle.

4. A fixed type constant velocity universal joint according to claim 1, wherein the fixing means is a caulked portion formed through radially inward plastic deformation of an end portion of the outside member to effect locking to an end portion of the inside member.

5. A fixed type constant velocity universal joint according to claim 1, wherein the fixed type constant velocity universal joint is used in a steering device arranged between a steering wheel and a steering gear of a vehicle.

6. A fixed type constant velocity universal joint comprising:

an outer member having a multi-layer structure of three or more layers including an outside member, one or more intermediate members, and an inside member, and a spherical inner surface with a plurality of track grooves formed therein;

an inner member having a spherical outer surface with a plurality of track grooves formed therein;

a plurality of balls each arranged in a wedge-shaped ball track formed by the track groove of the outer member and the track groove of the inner member;

a retainer arranged between the spherical inner surface of the outer member and spherical outer surface of the inner member and adapted to retain the plurality of balls; and a fixing means for fit-engaging the inside member with the outside member thereby integrally fixing together the outside member, the one or more intermediate members, and the inside member, and wherein at least one of the one or more intermediate members is formed of an elastic material, and wherein the fixing means is equipped with a cylinder portion to be fitted onto an outer side of an opening end portion of the outside member, and a lock portion extending radially inwards from an end portion of the cylinder portion to be locked to an end portion of the inside member.

7. A fixed type constant velocity universal joint according to claim 6, wherein the elastic material comprises a rubber material.

8. A fixed type constant velocity universal joint according to claim 6, wherein the fixed type constant velocity universal joint is used in a steering device arranged between a steering wheel and a steering gear of a vehicle.

9. A fixed type constant velocity universal joint comprising:

an outer member having a multi-layer structure of three or more layers including an outside member, one or more intermediate members, and an inside member, and a spherical inner surface with a plurality of track grooves formed therein;

an inner member having a spherical outer surface with a plurality of track grooves formed therein;

a plurality of balls each arranged in a wedge-shaped ball track formed by the track groove of the outer member and the track groove of the inner member;

a retainer arranged between the spherical inner surface of the outer member and spherical outer surface of the inner member and adapted to retain the plurality of balls; and a fixing means for fit-engaging the inside member with the outside member thereby integrally fixing together the outside member, the one or more intermediate members, and the inside member, wherein at least one of the one or more intermediate members is formed of an elastic material, wherein the outside member and the inside member are provided with engagement portions for effecting torque transmission, and wherein the fixing means is equipped with a cylinder portion to be fitted onto an outer side of an opening end portion of the outside member, and a lock portion extending radially inwards from an end portion of the cylinder portion to be locked to an end portion of the inside member.

10. A fixed type constant velocity universal joint according to claim 9, wherein the elastic material comprises a rubber material.

11. A fixed type constant velocity universal joint according to claim 9, wherein the fixed type constant velocity universal joint is used in a steering device arranged between a steering wheel and a steering gear of a vehicle.

* * * * *